US012731573B2

(12) United States Patent
Yanamandra et al.

(10) Patent No.: US 12,731,573 B2
(45) Date of Patent: Sep. 8, 2026

(54) ENHANCED SPOKEN DIALOGUE MODIFICATION

(71) Applicant: Amazon Technologies, Inc., Seattle, WA (US)

(72) Inventors: Abhishek Yanamandra, Seattle, WA (US); Sarah Elizabeth Norred, Seattle, WA (US); Hector Josue Santos Villalobos, Knoxville, TN (US); Rohith Mysore Vijaya Kumar, Campbell, CA (US)

(73) Assignee: Amazon Technologies, Inc., Seattle, WA (US)

( * ) Notice: Subject to any disclaimer, the term of this patent is extended or adjusted under 35 U.S.C. 154(b) by 391 days.

(21) Appl. No.: 18/325,516

(22) Filed: May 30, 2023

(65) Prior Publication Data

US 2024/0404503 A1 Dec. 5, 2024

(51) Int. Cl.

*G10L 13/027* (2013.01)
*G10L 21/0208* (2013.01)
*H04N 21/43* (2011.01)
*G10L 13/02* (2013.01)

(52) U.S. Cl.

CPC ........ *G10L 13/027* (2013.01); *G10L 21/0208* (2013.01); *H04N 21/4307* (2013.01); *G10L 2013/021* (2013.01)

(58) Field of Classification Search

CPC ... G10L 13/027; G10L 21/0208; H04N 21/43; H04N 21/4307
See application file for complete search history.

(56) References Cited

U.S. PATENT DOCUMENTS

| | | | | |
|---|---|---|---|---|
| 2018/0182373 | A1* | 6/2018 | Almudafar-Depeyrot | G06F 40/30 |
| 2019/0348030 | A1* | 11/2019 | Anders | G10L 15/19 |
| 2020/0243094 | A1* | 7/2020 | Thomson | G10L 15/28 |
| 2020/0265829 | A1* | 8/2020 | Liu | G10L 13/033 |
| 2022/0093101 | A1* | 3/2022 | Krishnan | G06V 40/20 |
| 2023/0195783 | A1* | 6/2023 | Millington | H03G 5/165 704/270 |
| 2023/0386116 | A1* | 11/2023 | Ding | G10L 13/00 |

* cited by examiner

*Primary Examiner* — Richemond Dorvil
*Assistant Examiner* — Ethan Daniel Kim
(74) *Attorney, Agent, or Firm* — Eversheds Sutherland (US) LLP

(57) ABSTRACT

A method for modifying recorded audio of a video title may include: identifying a video title available for presentation; identifying a portion of audio data, of the video title, representing dialogue of an actor of the video title; identifying a first utterance of the dialogue to be replaced in the video title; selecting, based on a replaceable amount of the audio data, a second utterance to replace the utterance word in the portion of the audio data; generating, based on a voice profile of the actor, first speech signals representing the actor uttering the second utterance; removing second speech signals representing the actor uttering the first utterance from the dialogue; adding the first speech signals into the dialogue using at least a portion of the replaceable amount; and generating a modified version of the video title comprising the dialogue with the speech signals added.

20 Claims, 7 Drawing Sheets

ENHANCED SPOKEN DIALOGUE MODIFICATION

BACKGROUND

Post-production modification of spoken dialogue in movies and episodes can be a lengthy process with editing. In addition, listening to edited vocals can be jarring or confusing for a viewer, limiting when to use edited dialogue, such as for content moderation in television broadcasts.

BRIEF DESCRIPTION OF THE DRAWINGS

To easily identify the discussion of any particular element or act, the most significant digit or digits in a reference number refer to the figure number in which that element is first introduced.

Figure 1:
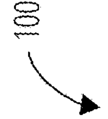
FIG. 1 illustrates an example process for spoken dialogue modification in video, in accordance with one or more example embodiments of the present disclosure.
Figure 1:
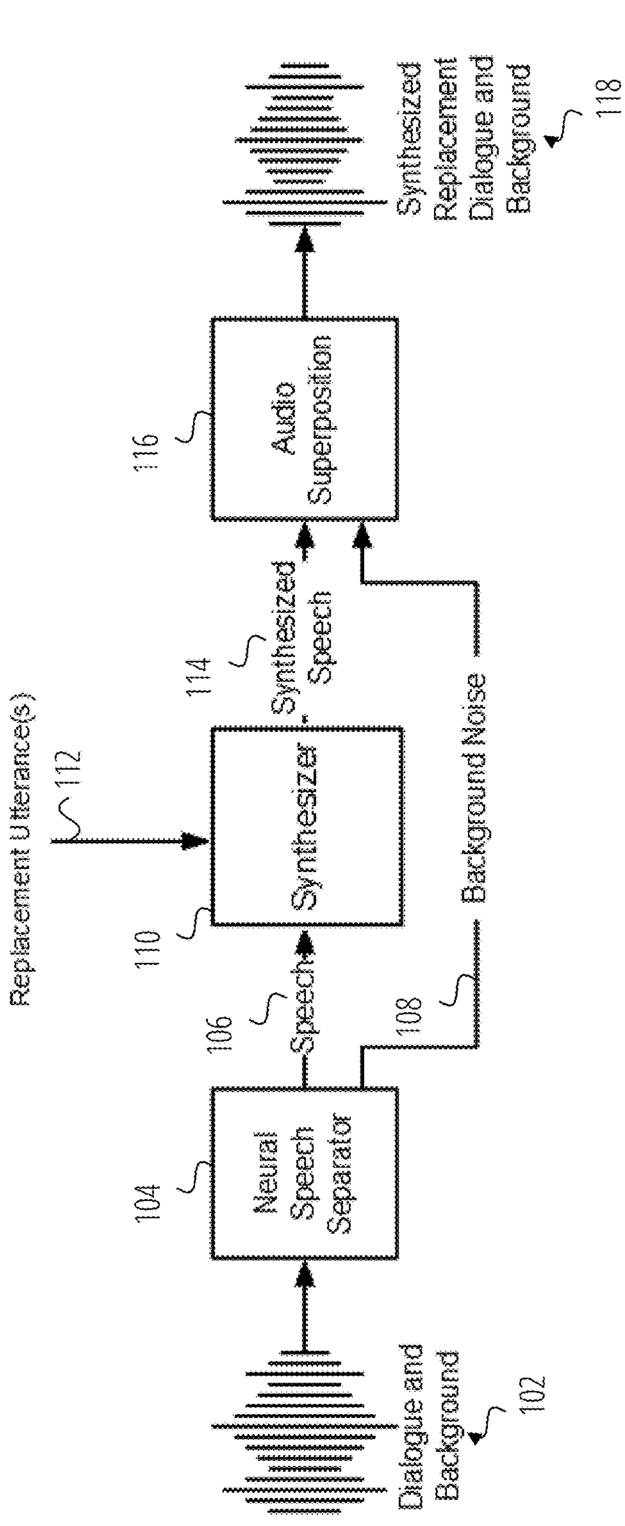

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for video annotations using image analysis.

The audio presented for some video, such as movies and television episodes (e.g., video titles) may be edited for a variety of reasons, such as to replace curse words or other offensive words. In some cases, such replacement may be required, such as editing a video title for coarse language to be presentable on cable or local television networks.

Modifying audio of a video title is often performed post-production, and can be a lengthy and human-intensive process. The modification may undermine user experience because, for example, replacement words in the audio may be noticeably different from the original words, and the replacement words may be presented in a voice or at a pace that is noticeably different than the original delivery, for example.

In some modifications, an actor may re-record audio to replace course language from a previously recorded video title. Other techniques may allow for creating virtual representations of a younger version of an actor, or representing a deceased actor on screen. However, such techniques may not modify previously recorded audio and video. In this manner, such techniques may not select replacement words to be spoken based on the words that are being replaced, such as the time duration of the replaced words, the words before and after the replaced words, the background noise during which the replaced words are spoken, the tone, accent, and/or pace at which the actor is speaking, and the like.

Thus, the enhanced spoken dialogue modification using replacement audio as described herein may solve a problem that is not addressed by existing creation of audio to represent a younger version of an actor's voice or to represent an actor not physically able to record their voice, and may improve post-production modifications by not requiring re-recording of replacement audio or insertion of replacement audio that is noticeably different than the audio surrounding the replacement audio.

In one or more embodiments, enhanced modification of spoken dialogue in movies and episodes may use a platform that enables automated modification of spoken dialogue by using extraction of the speaker's dialogue from audio, synthesis of new audio with desired text similar to the speaker's voice, and seamless re-insertion of the modified dialogue into the background audio. The fast turnaround and seamless-sounding audio offered by the enhanced techniques herein improve more expensive dialogue modification applications, like profanity replacement in pre-stored video, and enable new techniques not previously achievable, like modification of streaming content or inserting "soft" advertisements and product placement into cinematic audio. For example, when spoken dialogue of video title audio includes the sentence, "I want pizza," the sentence may be modified using the enhancements herein for a spoken product placement, such as "I want Brand X" where Brand X is a pizza brand, effectively rendering the dialogue as a soft advertisement.

In one or more embodiments, the speaker's dialogue (e.g., "I want pizza") may be removed from the audio track using signal processing techniques and speech separation models. Then, the target dialogue (e.g., "I want Brand X") may be synthesized using audio samples from the actor's dialogue (e.g., to ensure that the replacement dialogue comes from the same person), including from other places where the actor speaks in the title or stream. The new target dialogue may be synthesized to match the tone and prosody of the actor's original dialogue using voice-conditioned text-to-speech machine learning models. Then, the target dialogue may be re-inserted into the original background noise and adjusted for sound level to sound as similar as possible to the original in volume, audio balance, and quality. This sequential process can be applied to profanity replacement as well.

While some existing modification processes create seamless-sounding modified audio, they may not also modify the video, meaning that viewers may notice when an actor's modified voice does not match the actor's original face and lip movements. In one or more embodiments, using face landmark detection and voice activity detection models, the enhanced platform herein additionally recognizes times in a title where modifying audio will be unobtrusive to the viewer, such as when the speaker's face is distant, not visible, or turned away from the camera. This allows the platform to automatically identify opportunities for creators when audio-only modification is possible, and when additional video editing (e.g., lip and face modification) may be necessary. This placement recognition also may create feedback for creators to know how visually disruptive audio modification will be to viewers, such as in profanity replacement, where the modification locations may not be easily altered.

In one or more embodiments, the platform may generate profiles of actors' voices to use in the synthesis so that replacement utterances (e.g., words, sounds, etc.) in an actor's dialogue are presented using the same actor's voice. The platform may use techniques to identify when a person on screen is talking, which person shown in screen is talking, and which actor is the person identified as talking. In this manner, the platform may identify which actor's voice profile to use in synthesizing the replacement audio. The profile may be generated using samples of the actor of a video title speaking within the same video title and/or during other video titles in which the actor is identified as speaking. In some embodiments, if the actor has spoken the word(s) to be used as replacements, the sound of the actor uttering those utterances may be selected from the profile for insertion as replacement audio. If the actor has not uttered the exact utterances, the actor's voice profile may be used to identify phonemes and visemes that correspond to the utterances being inserted as replacements so that the sounds of those utterances and the corresponding lip movements of the actor may be used in the replacement audio and video.

In one or more embodiments, to ensure that the replacement audio is at least very close to the time duration of the audio being replaced (e.g., to avoid replacement audio being significantly shorter or longer in time than the audio that it replaces), the replacement utterances may be selected based on the time needed to utter them. To identify relevant portions of the actor's voice from a voice profile with which to generate replacement audio, the platform may rely on vector embeddings of the audio of the actor's voice and of the audio to be replaced. The vector embeddings may represent features of the voice, with respective embedding values of the vector embeddings representing quantities of the features. A similar replacement audio sample of an actor's voice to the audio of the actor being replaced may be an audio sample whose distance between the vector embeddings is closest to or within a threshold distance of the vector embeddings of the audio being replaced. By using vector embeddings of the actor's voice from the same title or another title, the actor does not have to re-record audio for the video title. To generate the audio with the replacement utterances, the platform may generate a waveform using the desired replacement text based on the features of the actor's voice from the voice profile.

In one or more embodiments, the replacement audio may be selected based on context from the audio into which the replacement audio is being added, such as the time duration of the utterance(s) being replaced, the topic of the dialogue, the grammatical use of the utterance(s) being replaced (e.g., to ensure that a part of speech is not replaced with an utterance that lacks grammatical sense), the tone and/or emotion of the dialogue (e.g., to avoid replacing a happy word with a sad word that would be out of place, or a highly emotional word or delivery of the word with an unemotional word or delivery, etc.), and the like. In this manner, when evaluating for replacement audio, the selection of which utterances to use as replacement utterances may depend on the previously recorded audio representing the dialogue in a video title as opposed to generating the audio "from scratch" and not having to fit the generated audio into an existing (e.g., previously recorded) dialogue.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example process 100 for spoken dialogue modification in video, in accordance with one or more example embodiments of the present disclosure.

Referring to FIG. 1, the process 100 may include dialogue and background audio 102 from a video title (e.g., a previously recorded/generated video title available for presentation, such as using a streaming media application, linear television, or the like). A neural speech separator 104 may separate the dialogue and background audio 102 into speech 106 (e.g., representing the dialogue) and background noise 108 (e.g., as detailed further with respect to FIG. 3). A synthesizer 110 may remove one or more utterances of the speech 106 from the dialogue, and replace the one or more utterances with replacement utterance(s) 112 to generate modified audio of the dialogue into which the replacement utterance(s) 112 have been added and the one or more utterances removed. The synthesizer 110 may generate synthesized speech 114 in which the replacement utterance(s) 112 are generated using the voice of the actor who is identified as speaking the dialogue (e.g., using a voice profile of the actor rather than the actor re-recording the dialogue using the replacement utterance(s) 112 in place of the one or more utterances). The background noise 108 and the synthesized speech 114 may recombined using audio superposition 116 to generate synthesized replacement dialogue and background audio 118 in which the dialogue with the replacement utterance(s) 112 using the actor's voice are combined with the background noise 108 that was present prior to the addition of the replacement utterance(s) 112.

In one or more embodiments, the process 100 may enable automated modification of spoken dialogue (e.g., represented by the speech 106) by using extraction of the speaker's dialogue from the dialogue and background audio 102, synthesis of new audio with desired text similar to the speaker's voice at the synthesizer 110, and seamless re-insertion of the modified dialogue into the background audio at the audio superposition 116. The fast turnaround and seamless-sounding audio offered by the enhanced techniques herein improve more expensive dialogue modification applications, like profanity replacement in pre-stored video, and enable new techniques not previously achievable, like modification of streaming content or inserting "soft" advertisements and product placement into cinematic audio. For example, the process 100 may identify an existing advertisement campaign for a brand of an item mentioned in the speech 106, so the item may be the one or more utterances replaced using the replacement utterance(s) 112, which may include the brand based on the advertisement campaign. Alternatively or in addition, the replacement utterance(s) 112 may be non-course words used to replace course language.

In one or more embodiments, the speaker's dialogue (e.g., "I want pizza") may be removed from the audio track using signal processing techniques and speech separation models at the neural speech separator 104. Then, the replacement utterance(s) 112 (e.g., "I want Brand X") may be synthesized using audio samples from the actor's dialogue (e.g., to ensure that the replacement dialogue comes from the same person), including from other places where the actor speaks in the title or stream (e.g., of which the dialogue and background audio 102 is a portion). The replacement utterance(s) 112 may be synthesized (e.g., the synthesized speech 114) to match the tone and prosody of the actor's original dialogue using voice-conditioned text-to-speech machine learning models. Then, the target dialogue (e.g., the synthesized speech 114) may be re-inserted into the original background noise 108 and adjusted for sound level to sound as similar as possible to the original in volume, audio balance, and quality.

In one or more embodiments, using face landmark detection and voice activity detection models (e.g., as further described in FIG. 2), the process 100 additionally may recognize times in a title where modifying audio will be unobtrusive to the viewer, such as when the speaker's face is distant, not visible, or turned away from the camera. This allows the process 100 to automatically identify opportunities for creators when audio-only modification is possible, and when additional video editing (e.g., lip and face modification) may be necessary. This placement recognition also may create feedback for creators to know how visually disruptive audio modification will be to viewers, such as in profanity replacement, where the modification locations may not be easily altered.

In one or more embodiments, the process 100 may generate profiles of actors' voices to use in the synthesis so that the replacement utterance(s) 112 in an actor's dialogue are presented using the same actor's voice. The process 100 may use techniques to identify when a person on screen is talking, which person shown in screen is talking, and which actor is the person identified as talking. In this manner, the process 100 may identify which actor's voice profile to use in synthesizing the replacement audio. The profile may be generated using samples of the actor of a video title speaking within the same video title and/or during other video titles in which the actor is identified as speaking. In some embodiments, if the actor has uttered the utterances(s) to be used as replacements, the sound of the actor uttering those utterances may be selected from the profile for insertion as replacement audio. If the actor has not uttered the exact utterances, the actor's voice profile may be used to identify phonemes and visemes that correspond to the utterances being inserted as replacements so that the sounds of those utterances and the corresponding lip movements of the actor may be used in the replacement audio and video.

In one or more embodiments, to ensure that the replacement audio is at least very close to the time duration of the audio being replaced (e.g., to avoid replacement audio being significantly shorter or longer in time than the audio that it replaces), the replacement utterance(s) 112 may be selected based on the time needed to speak them. To identify relevant portions of the actor's voice from a voice profile with which to generate replacement audio, the process 100 may rely on vector embeddings of the audio of the actor's voice and of the audio to be replaced. The vector embeddings may represent features of the voice, with respective embedding values of the vector embeddings representing quantities of the features. A similar replacement audio sample of an actor's voice to the audio of the actor being replaced may be an audio sample whose distance between the vector embeddings is closest to or within a threshold distance of the vector embeddings of the audio being replaced. By using vector embeddings of the actor's voice from the same title or another title, the actor does not have to re-record audio for the video title. To generate the audio with the replacement utterances, the platform may generate a waveform using the desired replacement text based on the features of the actor's voice from the voice profile.

In one or more embodiments, the replacement audio may be selected based on context from the audio into which the replacement audio is being added, such as the time duration of the utterances(s) being replaced, the topic of the dialogue, the grammatical use of the word(s) being replaced (e.g., to ensure that a part of speech is not replaced with a word that lacks grammatical sense), the tone and/or emotion of the dialogue (e.g., to avoid replacing a happy word with a sad word that would be out of place, or a highly emotional word or delivery of the word with an unemotional word or delivery, etc.), and the like. In this manner, when evaluating for replacement audio, the selection of which utterances to use as the replacement utterance(s) 112 may depend on the previously recorded audio representing the dialogue in a video title as opposed to generating the audio "from scratch" and not having to fit the generated audio into an existing (e.g., previously recorded) dialogue.

Figure 2:
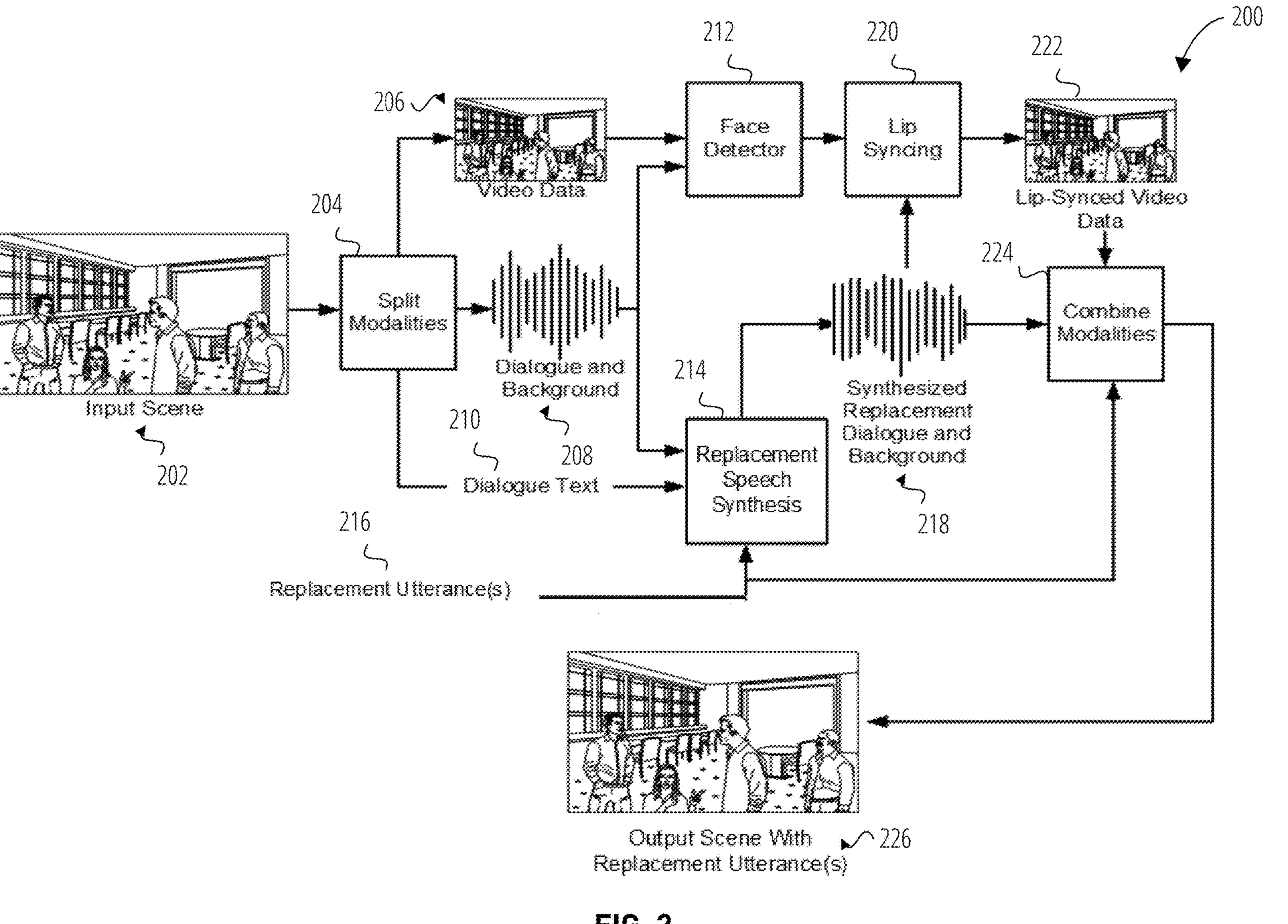
FIG. 2 illustrates an example process for spoken dialogue modification in video, in accordance with one or more example embodiments of the present disclosure.

FIG. 2 illustrates an example process 200 for spoken dialogue modification in video, in accordance with one or more example embodiments of the present disclosure.

Referring to FIG. 2, an input scene 202 of a video title (e.g., a previously recorded/generated video title available for presentation, such as using a streaming media application, linear television, or the like) may be split into multiple modalities by split modalities 204 modules. For example, the input scene 202 may be split into video data 206, dialogue and background audio 208, and dialogue text 210 (e.g., text of the dialogue from the dialogue and background audio 208). The video data 206 may be input to a face detector 212 to detect face and/or lip presence in video frames. The face detector 212 may receive the dialogue and background audio 208 to determine, based on detected face/lip movement, which actor represented in the video data 206 is speaking the dialogue from the dialogue and background audio 208. The dialogue and background audio 208 and the dialogue text 210 may be input to a replacement speech synthesis 214, along with replacement utterance(s) 216 which may replace one or more utterances of the dialogue.

Still referring to FIG. 2, the replacement speech synthesis 214 may identify and remove the one or more utterances to be replaced (e.g., remove the speech signals corresponding to the one or more utterances), generate speech signals representing replacement utterance(s) 216 spoken in the voice of the actor identified as speaking the dialogue, and insert the speech signals representing replacement utterance(s) 216 spoken in the voice of the actor into the dialogue as a replacement for the one or more utterances being replaced. The result may be synthesized replacement dialogue and background audio 218, which may be input to lip syncing 220 along with the detected face/lip data from the face detector 212. The lip syncing 220 may synchronize the face/lips of the actor speaking the dialogue with the synthesized replacement dialogue and background audio 218 (e.g., using visemes corresponding to phonemes of the replacement utterance(s) 216). As a result, lip-synced data 222 may include video data in which the speaking actor's face/lips, if present during the dialogue, are shown as speaking the dialogue, including the replacement utterance(s) 216. The lip-synced data 222, the synthesized replacement dialogue and background audio 218, and the text of the replacement utterance(s) 216 may be input to combine modalities 224 so that an output scene with replacement utterance(s) 226 may be generated to include the synthesized replacement dialogue and background audio 218, the lip-synced data 222, and optionally text of the dialogue, including text of the replacement utterance(s) 216.

In one or more embodiments, the process 200 may enable automated modification of spoken dialogue (e.g., represented by the dialogue of the dialogue and background audio 208) by using extraction of the speaker's dialogue from the dialogue and background audio 208, synthesis of new audio with desired text similar to the speaker's voice, and seamless re-insertion of the modified dialogue into the background audio. The fast turnaround and seamless-sounding audio offered by the enhanced techniques herein improve more expensive dialogue modification applications, like profanity replacement in pre-stored video, and enable new techniques not previously achievable, like modification of streaming content or inserting "soft" advertisements and product placement into cinematic audio. For example, the process 200 may identify an existing advertisement campaign for a brand of an item mentioned in the dialogue, so the item may be the one or more utterances replaced using the replacement utterance(s) 216, which may include the brand based on the advertisement campaign. Alternatively or in addition, the replacement utterance(s) 216 may be non-course words used to replace course language. Referring to FIGS. 1 and 2, the replacement utterances may be based on one or more lists of utterances, utterances from advertising campaigns, or learned (e.g., using machine learning, such as machine learning trained based on criteria such as removing course language or identifying advertisement opportunities from the dialogue).

In one or more embodiments, the speaker's dialogue may be removed from the audio track using signal processing techniques and speech separation models. Then, the replacement utterance(s) 216 may be synthesized using audio samples from the actor's dialogue (e.g., to ensure that the replacement dialogue comes from the same person), including from other places where the actor speaks in the title or stream (e.g., of which the dialogue and background audio 208 is a portion). The replacement utterance(s) 216 may be synthesized (e.g., the synthesized replacement dialogue and background audio 218) to match the tone and prosody of the actor's original dialogue using voice-conditioned text-to-speech machine learning models. Then, the target dialogue may be re-inserted into the original background noise and adjusted for sound level to sound as similar as possible to the original in volume, audio balance, and quality.

In one or more embodiments, using face landmark detection and voice activity detection models (e.g., at the face detector 212), the process 200 additionally may recognize times in a title where modifying audio will be unobtrusive to the viewer, such as when the speaker's face is distant, not visible, or turned away from the camera. This allows the process 200 to automatically identify opportunities for creators when audio-only modification is possible, and when additional video editing (e.g., lip and face modification) may be necessary. This placement recognition also may create feedback for creators to know how visually disruptive audio modification will be to viewers, such as in profanity replacement, where the modification locations may not be easily altered.

In one or more embodiments, the process 200 may generate profiles of actors' voices to use in the synthesis so that the replacement utterance(s) 216 in an actor's dialogue are presented using the same actor's voice. The process 200 may use techniques to identify when a person on screen is talking, which person shown in screen is talking, and which actor is the person identified as talking. In this manner, the process 200 may identify which actor's voice profile to use in synthesizing the replacement audio. The profile may be generated using samples of the actor of a video title speaking within the same video title and/or during other video titles in which the actor is identified as speaking. In some embodiments, if the actor has uttered the utterance(s) to be used as replacements, the sound of the actor uttering those utterances may be selected from the profile for insertion as replacement audio. If the actor has not uttered the exact utterances, the actor's voice profile may be used to identify phonemes and visemes that correspond to the utterances being inserted as replacements so that the sounds of those utterances and the corresponding lip movements of the actor may be used in the replacement audio and video.

In one or more embodiments, to ensure that the replacement audio is at least very close to the time duration of the audio being replaced (e.g., to avoid replacement audio being significantly shorter or longer in time than the audio that it replaces), the replacement utterance(s) 216 may be selected based on the time needed to speak them. To identify relevant portions of the actor's voice from a voice profile with which to generate replacement audio, the process 200 may rely on vector embeddings of the audio of the actor's voice and of the audio to be replaced. The vector embeddings may represent features of the voice, with respective embedding values of the vector embeddings representing quantities of the features. A similar replacement audio sample of an actor's voice to the audio of the actor being replaced may be an audio sample whose distance between the vector embeddings is closest to or within a threshold distance of the vector embeddings of the audio being replaced. By using vector embeddings of the actor's voice from the same title or another title, the actor does not have to re-record audio for the video title. To generate the audio with the replacement utterances, the platform may generate a waveform using the desired replacement text based on the features of the actor's voice from the voice profile.

In one or more embodiments, the replacement audio may be selected based on context from the audio into which the replacement audio is being added, such as the time duration of the utterances(s) being replaced, the topic of the dialogue, the grammatical use of the utterances(s) being replaced (e.g., to ensure that a part of speech is not replaced with a word that lacks grammatical sense), the tone and/or emotion of the dialogue (e.g., to avoid replacing a happy word with a sad word that would be out of place, or a highly emotional word or delivery of the word with an unemotional word or delivery, etc.), and the like. In this manner, when evaluating for replacement audio, the selection of which utterances to use as the replacement utterance(s) 216 may depend on the previously recorded audio representing the dialogue in a video title as opposed to generating the audio "from scratch" and not having to fit the generated audio into an existing (e.g., previously recorded) dialogue.

Referring to FIGS. 1 and 2, the use of an actor's voice profile should be distinguished from actor re-recording of the audio of a video title. Instead, using the voice of an actor, such as from other dialogue of the actor within the same video title and/or the actor's dialogue in another video title, the actor voice profile may be used to generate speech waves that represent the actor's voice uttering the replacement utterances. The representation of the actor's voice may include using a version of the actor actually uttering the replacement utterances, or simulating what the actor's voice would sound like uttering the replacement utterances.

Figure 3:
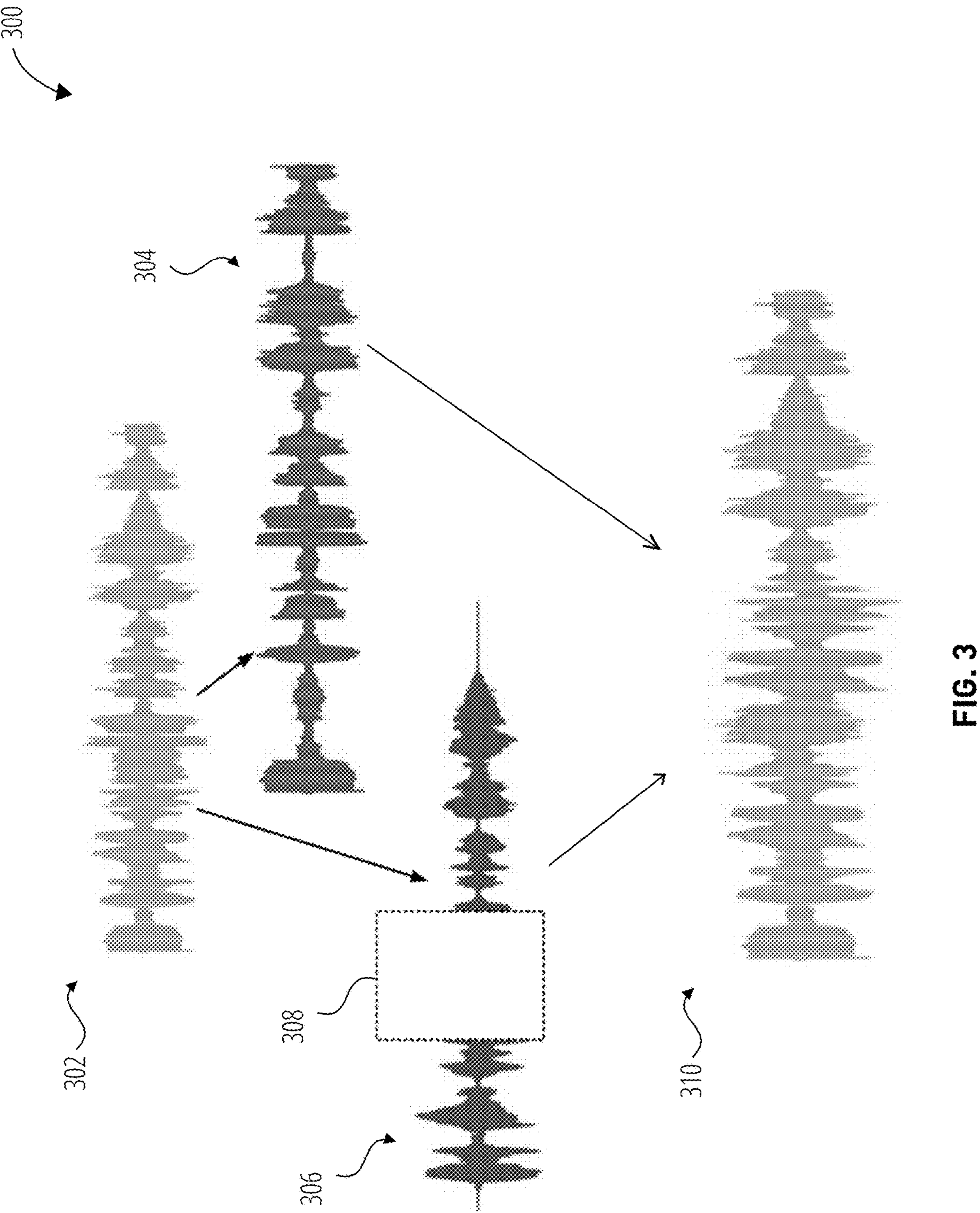
FIG. 3 illustrates an example process for separating audio into spoken dialogue and background noise for dialogue modification in video, in accordance with one or more example embodiments of the present disclosure.

FIG. 3 illustrates an example process 300 for separating audio into spoken dialogue and background noise for dialogue modification in video, in accordance with one or more example embodiments of the present disclosure.

Referring to FIG. 3, audio 302 may include sound waves (e.g., the dialogue and background audio 102 of FIG. 1, the dialogue and background audio 208 of FIG. 2) that may be split into background noise 304 and speech 306 (e.g., representing dialogue of an actor in a video title). The sound waves of the speech 306 may represent the phonemes of the words spoken in the represented dialogue. One or more utterances, and their corresponding speech signals 308, may be removed from the speech 306, and replacement utterances may be added to the speech 306 in place of the one or more utterances, and then synthesized in the voice of the actor. The speech signals 308 with replacement utterances may be recombined with the background noise 304 to generate synthesized replacement audio and background 310.

In one or more embodiments, isolating the background noise 304 and the speech 306 from the audio 302 may include using filters (e.g., high-pass and/or low-pass filters) to filter out high-pitch and low-pitch noises. Alternatively or in addition, sound profiles of known dialogue and/or noise may be used to compare to the audio 302 to detect the background noise 304 and/or the speech 306.

In one or more embodiments, the speech signals 308 may begin at a time when the actor begins to speak the one or more utterances represented by the speech signals 308, and may end at a time when the actor completes (finishes) the speaking of the one or more utterances represented by the speech signals 308. The replacement utterances added to the speech 306 may be selected to fit within the time duration between the beginning time and the end time, or may be shorter or longer in time. When the replacement utterances are shorter or longer in time duration than the one or more utterances being replaced, the corresponding signals of the replacement utterances may be shortened or lengthened if consistent with the pace and pitch of the surrounding dialogue, or the surrounding dialogue and background signals may be elongated or compressed accordingly to avoid silent gaps in the middle of a sentence, to avoid replacement utterances overlapping with subsequent dialogue, and/or to avoid the background noise 304 being out of sync with the speech 306 when presented in the modified video title.

Figure 4:
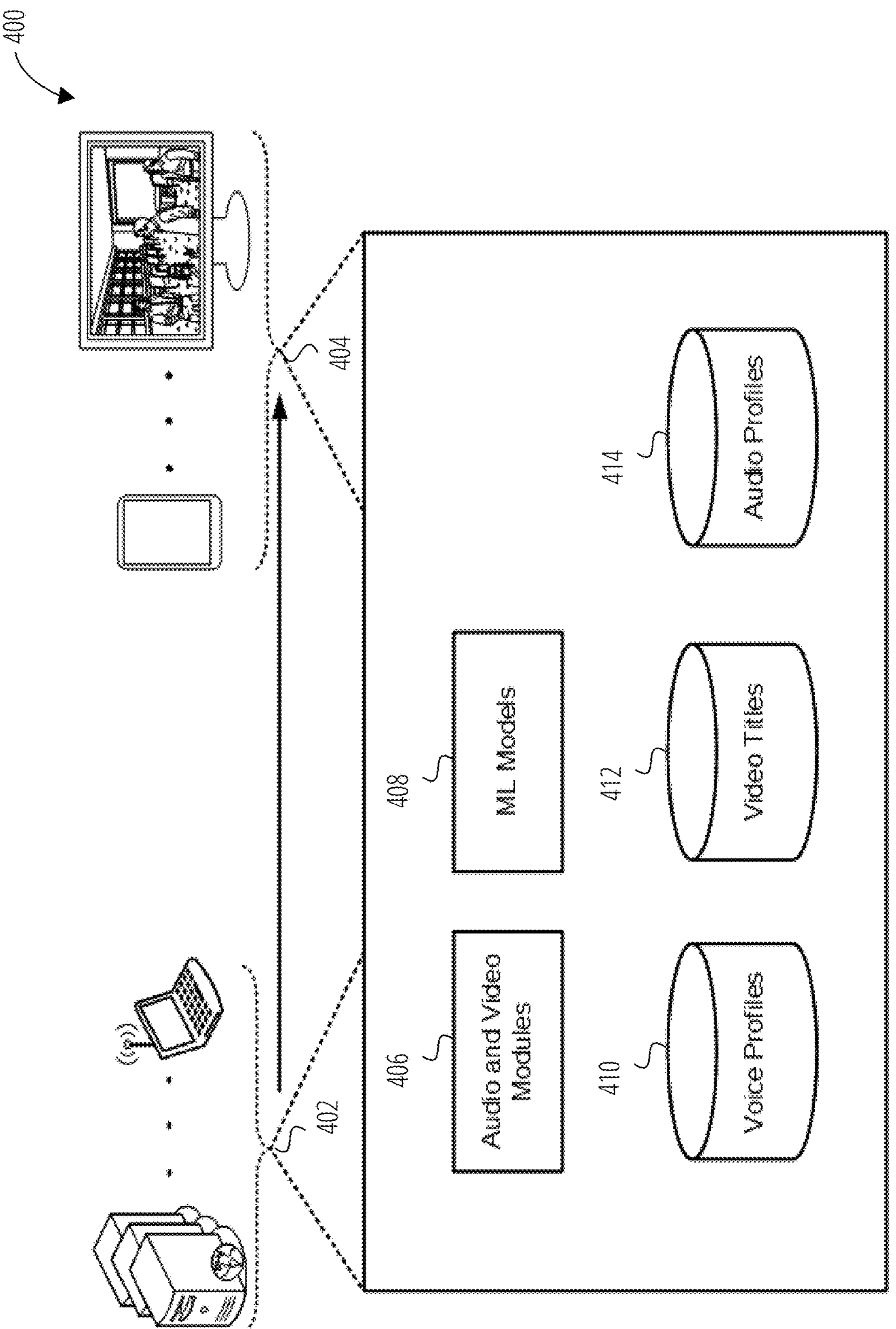
FIG. 4 illustrates an example system for spoken dialogue modification in video, in accordance with one or more example embodiments of the present disclosure.

FIG. 4 illustrates an example system 400 for spoken dialogue modification in video, in accordance with one or more example embodiments of the present disclosure.

Referring to FIG. 4, the system 400 may include devices 402 and devices 404, any of which may perform the process 100 and/or the process 200. For example, the devices 402 may generate and provide modified video to the devices 404, or may provide the unmodified video to the devices 404, which may perform the modifications. The devices 402 and/or the devices 404 may include audio and video modules 406, including video coders and decoders, software and hardware for processing and presenting video and audio data, and the architecture to perform the process 100 and/or the process 200 to generate the modified audio and video. The devices 402 and the devices 404 may include ML models 408 (e.g., for face/lip detection, for identifying utterances to be replaced in dialogue and replacement utterances for the dialogue, etc.), actor voice profiles 410, video titles 412, and audio profiles 414 (e.g., of dialogue and/or background noise used to isolate the background noise 304 and the speech 306 from the audio 302, for example).

In one or more embodiments, the voice profiles 410 may be generated on-the-fly using audio of an actor's voice from the video title being presented. For example, in a video title that is being streamed for presentation, the actor's voice from dialogue in the video title that is being presented in the stream may be used to generate the voice profiles 410.

Figure 5:
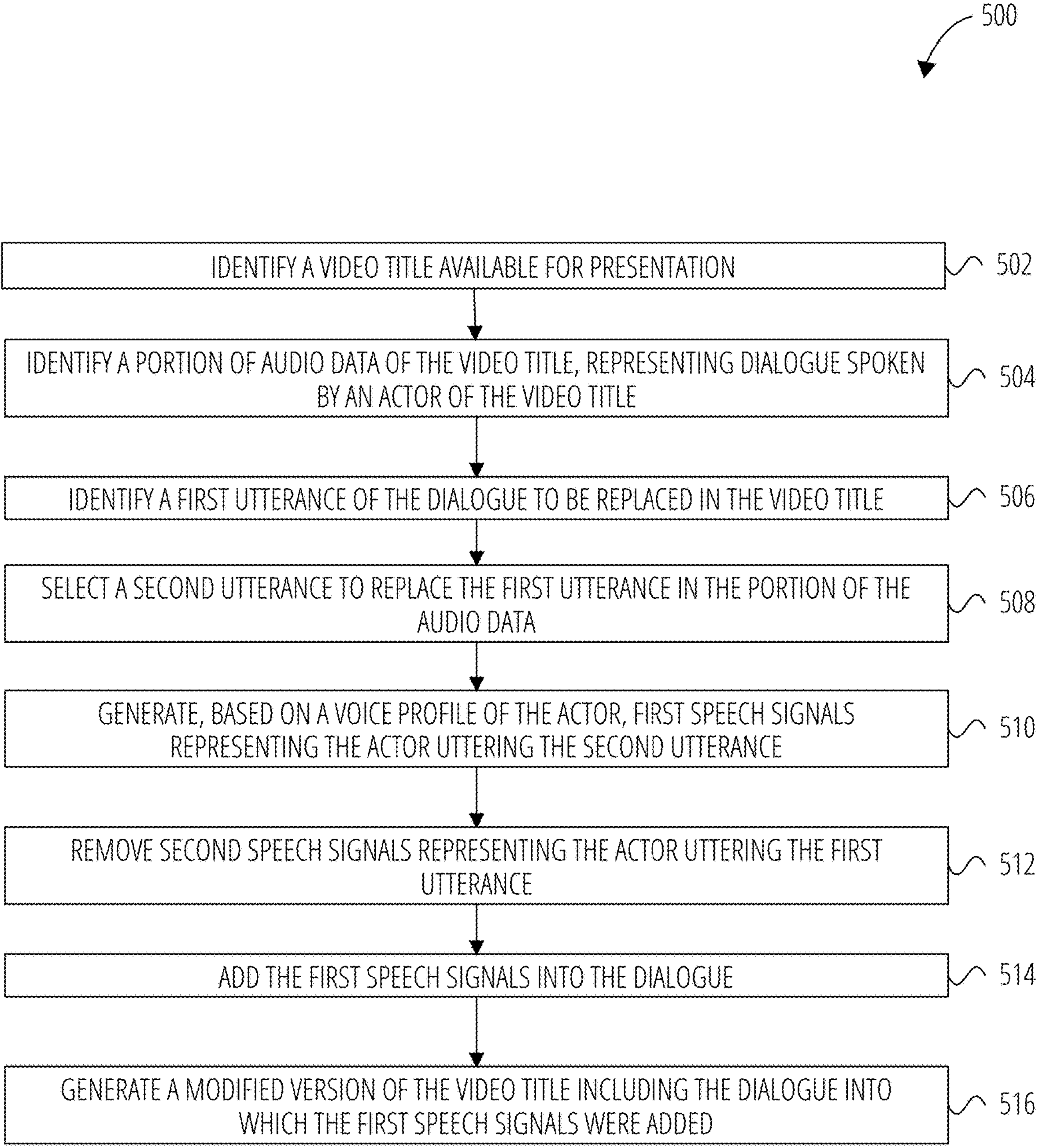
FIG. 5 illustrates a flow diagram for an example process for spoken dialogue modification in video, in accordance with one or more example embodiments of the present disclosure.

FIG. 5 illustrates a flow diagram for an example process 500 for spoken dialogue modification in video, in accordance with one or more example embodiments of the present disclosure.

Figure 7:
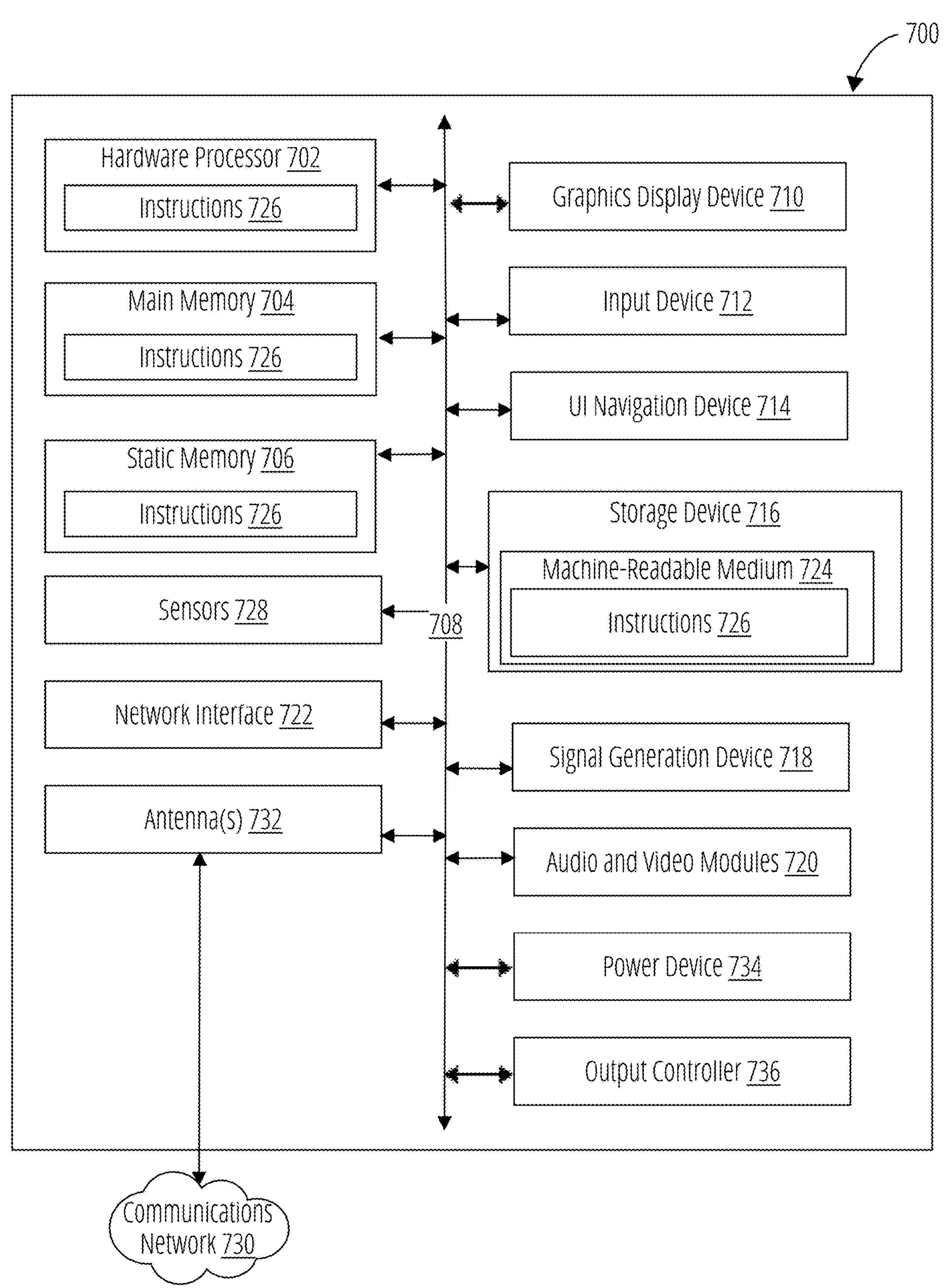
FIG. 7 illustrates a block diagram of an example machine upon which any of one or more techniques (e.g., methods) may be performed, in accordance with one or more example embodiments of the present disclosure.

At block 502, a device (or system, e.g., the devices 402, the devices 404, and/or the audio and video modules 720 of FIG. 7), may identify a video title available for presentation. The video title may be a streaming video title presented using a streaming media application (e.g., over-the-top video streams), or linear television. The video title may have video frames (e.g., representing the input scene 202).

At block 504, the device may identify a portion of audio data of the video title and representing dialogue spoken by an actor of the video title (e.g., the dialogue and back ground audio 102, the dialogue and background audio 208, the audio 302). For example, the device may analyze audio to detect the presence of dialogue in the audio of the video title. To determine which actor spoke the dialogue, the device may use face/lip detection to identify movement of a presented actor's face/lips during the video frames when the dialogue is present, and determine which actor on screen is talking (e.g., if the actor speaking is shown on screen and their face/lip movement may be detected at that time). Audio profiles and/or filtering may allow for isolation of dialogue and background noise.

At block 506, the device may identify a first utterances of the dialogue to be replaced in the video title. Identifying the first utterance may be based on matching audio or text of the audio (e.g., using speech-to-text conversion) to keywords in one more lists of keywords, based on machine learning trained to identify utterances to be replaced, or based on utterances associated with items/products that may be sold or advertised. For example, the first word may be a course word, or may be an item for which an advertising campaign may exist for the item or its type.

At block 508, the device may select a second utterance (e.g., the replacement utterance(s) 112, the replacement utterance(s) 216) to replace the first utterance in the portion of the audio data. The second utterance may be from a list of non-course replacement words, based on machine learning trained to replace utterances with similar meaning utterances that fit within a same time duration, or may represent a brand as an advertisement. The second utterance may be selected based at least partially on an amount of the audio that is replaceable, which may correspond to the amount of time in the audio data during which the first utterance is uttered. The second utterance may be longer or shorter in duration than the time used by the first utterance in the audio data. In this manner, the replaceable amount of the audio may depend on the duration of the first utterance, but does not have to be the exact amount of time used by the first utterance.

At block 510, the device may generate, based on a voice profile of the actor identified as speaking the dialogue with the first word, first speech signals representing the actor speaking the second word. The voice profile of the actor may be generated using voice samples of the actor, from the actor's voice in the same video title and/or other video titles. The voice profile may include the actor speaking the second word, or the voice profile may be used to simulate how the actor would sound speaking the second word, and generating the first speech signals to represent the phonemes of that speech.

At block 512, the device may remove second speech signals (e.g., the speech signals 308 of FIG. 3) from the dialogue speech signals of the actor speaking the first word being removed from the dialogue.

At block 514, the device may add the first speech signals into the dialogue using at least a portion of the time duration of the removed second speech signals. In this manner, the first speech signals of the replacement audio may be added to the existing dialogue audio by using the removed second speech signals from the speech signals of the dialogue (e.g., as shown in FIG. 3).

At block 516, the device may generate a modified version of the video title including the dialogue into which the first speech signals were added as replacements for the second speech signals. The modified version may synthesize and synchronize the video, audio, and text of the dialogue. When the actor's face is shown speaking the dialogue, the device may modify the video data of the actor's face/lips to show the actor (e.g., using visemes) speaking the phonemes of the replacement utterances of the first speech signals.

Figure 6:
FIG. 6 illustrates a flow diagram for an example process for spoken dialogue modification in video, in accordance with one or more example embodiments of the present disclosure.
Figure 6:
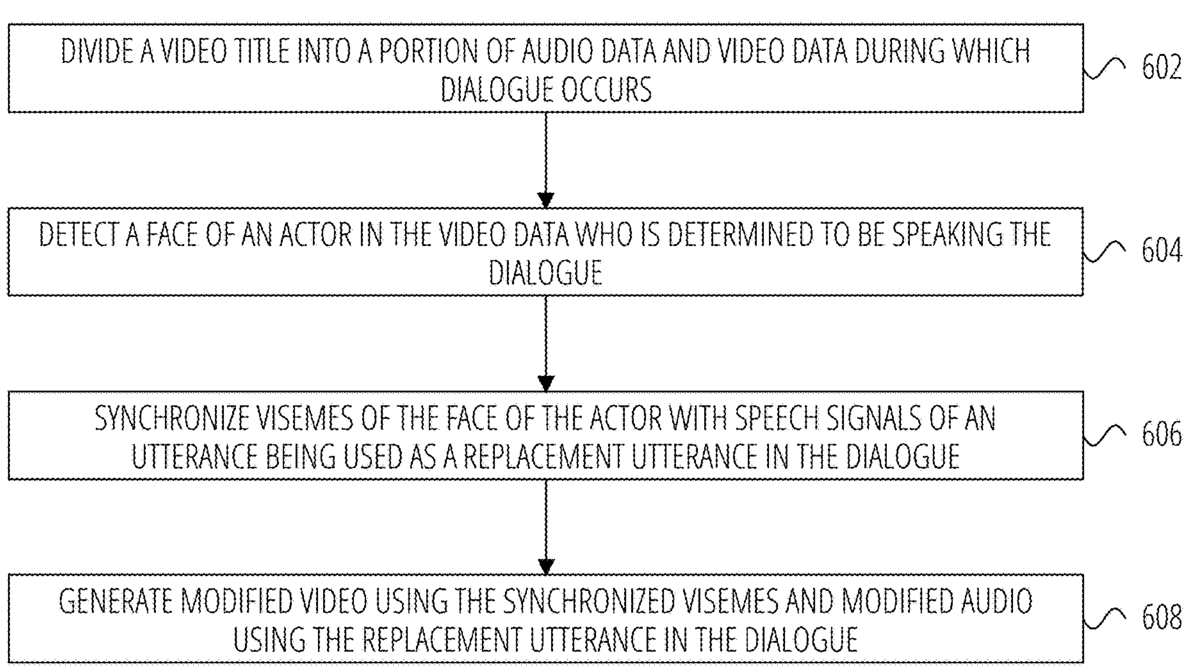

FIG. 6 illustrates a flow diagram for an example process 600 for spoken dialogue modification in video, in accordance with one or more example embodiments of the present disclosure.

At block 602, a device (or system, e.g., the devices 402, the devices 404, and/or the audio and video modules 720 of FIG. 7), may divided a video title into a portion of audio data (e.g., the dialogue and background audio 208) and video data (e.g., the video data 206) during which dialogue occurs. The video title may be a streaming video title presented using a streaming media application (e.g., over-the-top video streams), or linear television. The video title may have video frames (e.g., representing the input scene 202). For example, the device may analyze audio to detect the presence of dialogue in the audio of the video title.

At block 604, the device may detect an actor's face and/or lips in the video data who is determined to be speaking the dialogue. To determine which actor spoke the dialogue, the device may use face/lip detection to identify movement of a presented actor's face/lips during the video frames when the dialogue is present, and determine which actor on screen is talking (e.g., if the actor speaking is shown on screen and their face/lip movement may be detected at that time). Audio profiles and/or filtering may allow for isolation of dialogue and background noise.

At block 606, the device may synchronize visemes of the face of the actor with speech signals of a replacement word for the dialogue. The replacement word being added to the dialogue may have corresponding phonemes with corresponding visemes, so the device may modify the video data to show the actor's face/lips in the positions of the visemes corresponding to the phonemes of the replacement utterance.

At block 608, the device may generate modified video using the synchronized visemes and modified audio that uses the replacement word in the dialogue by removing one or more utterances and replacing the removed one or more utterances with the replacement utterance. The device may synthesize and synchronize the different modalities (e.g., the modified audio and the modified video, along with any modified text of the dialogue to include the replacement utterance).

The embodiments presented herein are exemplary and not meant to be limiting.

FIG. 7 illustrates a block diagram of an example machine upon which any of one or more techniques (e.g., methods) may be performed, in accordance with one or more example embodiments of the present disclosure.

In other embodiments, the machine 700 may operate as a standalone device or may be connected (e.g., networked) to other machines. In a networked deployment, the machine 700 may operate in the capacity of a server machine, a client machine, or both in server-client network environments. The machine 700 may be a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine 700 (e.g., computer system) may include a hardware processor 702 (e.g., a central processing unit (CPU), a graphics processing unit (GPU), a hardware processor core, or any combination thereof), a tensor processing unit (TPU), a main memory 704 and a static memory 706, some or all of which may communicate with each other via an interlink (e.g., bus 708). The machine 700 may further include a power device 734, a graphics display device 710, an input device 712 (e.g., a keyboard), and a user interface UI navigation de vice 714 (e.g., a mouse). In an example, the graphics display device 710, input device 712, and UI navigation device 714 may be a touch screen display. The machine 700 may additionally include a storage device 716, a signal generation device 718, one or more audio and video modules 720 (e.g., representing any combination of the devices 402, devices 404, the audio and video modules 406, and capable of performing steps according to FIGS. 1-6), a network interface 722 coupled to antenna(s) 732, and one or more sensors 728. The machine 700 may include an output controller 736, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 716 may include a machine-readable medium 724 on which is stored one or more sets of data structures or instructions 726 (e.g., software) embodying or utilized by any one or more of the techniques or functions described herein. The instructions 726 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

While the machine-readable medium 724 is illustrated as a single medium, the term "machine-readable medium" may include a single medium or multiple media (e.g., a centralized or distributed database, and/or associated caches and servers) configured to store the one or more instructions 726.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 726 may further be transmitted or received over a communications network 730 using a transmission medium via the network interface 722 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, among others. In an example, the network interface 722 may include one or more physical jacks (e.g., Ethernet, coaxial, or phone jacks) or one or more antennas to connect to the communications network 730. In an example, the network interface 722 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max. ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, “can,” “could,” “might,” or “may,” unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for modifying recorded audio of a video title, the method comprising:

identifying, by at least one processor of a device, a video title available for presentation;

identifying, by the at least one processor, a portion of audio data, of the video title, representing dialogue spoken by an actor of the video title;

identifying, by the at least one processor, the actor who spoke the dialogue;

dividing, by the at least one processor, the portion of the audio data into a first portion representing the dialogue and a second portion representing background noise during the dialogue;

identifying, by the at least one processor, a first lexical word of the dialogue to be replaced in the video title;

identifying, by the at least one processor, a first time at which the actor begins to speak the first lexical word and a second time at which the actor finishes speaking the first lexical word;

selecting, by the at least one processor, based on a time duration between the first time and the second time, a second lexical word different than the first lexical word to replace the first lexical word in the portion of the audio data;

identifying, by the at least one processor, a voice profile of the actor, wherein the voice profile represents audio samples of a voice of the actor from at least one of the video title or an additional video title;

generating, by the at least one processor, based on the voice profile, first speech signals simulating the actor speaking the second lexical word;

removing, by the at least one processor, second speech signals representing the actor speaking the first lexical word from the dialogue;

adding, by the at least one processor, the first speech signals into the dialogue using at least a portion of the time duration;

combining, by the at least one processor, the background noise with the dialogue into which the first speech signals were combined; and generating, by the at least one processor, a modified version of the video title comprising the background noise with the dialogue into which the first speech signals were added.

2. The method of claim 1, wherein the first lexical word represents an item, and wherein the second lexical word represents a brand associated with the item.

3. The method of claim 1, further comprising:

dividing the video title into the portion of the audio data and video data during the dialogue, wherein generating the modified version of the video title further comprises the video data combined with the first speech signals combined with the background noise.

4. The method of claim 3, further comprising:

detecting a face of the actor, in the video data, speaking the dialogue; and synchronizing visemes of the face of the actor with the second speech signals using phonemes of the second lexical word.

5. A method for modifying recorded audio of a video title, the method comprising:

identifying, by at least one processor of a device, a video title available for presentation;

identifying, by the at least one processor, a portion of audio data, of the video title, representing dialogue spoken by an actor of the video title;

identifying, by the at least one processor, the actor who spoke the dialogue;

identifying, by the at least one processor, a first utterance of the dialogue to be replaced in the video title;

selecting, by the at least one processor, based on a replaceable amount of the portion of the audio data a second utterance lexically different than the first utterance to replace the first utterance in the portion of the audio data;

generating, by the at least one processor, based on a voice profile of the actor, first speech signals representing the actor uttering the second utterance;

removing, by the at least one processor, second speech signals representing the actor uttering the first utterance from the dialogue;

adding, by the at least one processor, the first speech signals into the dialogue using at least a portion of the replaceable amount; and generating, by the at least one processor, a modified version of the video title comprising the dialogue into which the first speech signals were added.

6. The method of claim 5, wherein the first utterance represents an item, and wherein the second utterance represents a brand associated with the item.

7. The method of claim 5, wherein the first utterance represents coarse language, and wherein the second utterance does not represent course language.

8. The method of claim 5, further comprising:

dividing the portion of the audio data into a first portion representing the dialogue and a second portion representing background noise during the dialogue; and combining the speech signals with the background noise, wherein the modified version of the video title further comprises the background noise combined with the dialogue into which the first speech signals were added.

9. The method of claim 5, further comprising:

dividing the video title into the portion of the audio data and video data during the dialogue, wherein the modified version of the video title further comprises the video data combined with the dialogue into which the first speech signals were added.

10. The method of claim 9, further comprising:

detecting a face of the actor, in the video data, speaking the dialogue; and synchronizing visemes of the face of the actor with the first speech signals using phonemes of the second utterance.

11. The method of claim 5, further comprising:

determining that a face of the actor is not visible in video data during the dialogue, wherein identifying the first utterance of the dialogue to be replaced in the video title is based on determining that the face of the actor is not visible in the video data during the dialogue.

12. The method of claim 5, wherein the second utterance is selected to be spoken by the actor within an amount of time from a beginning of the first utterance to an end of the first utterance.

13. The method of claim 5, wherein the voice profile of the actor represents audio samples of a voice of the actor from at least one of the video title or an additional video title.

14. The method of claim 13, wherein generating the voice profile of the actor further comprises:

generating the voice profile of the actor using the audio data during presentation of the video title.

15. The method of claim 5, further comprising:

identifying a context of the dialogue, the context indicative of at least one of a topic of the dialogue, a tone of the dialogue, or a pace of the dialogue.

16. A system for modifying recorded audio of a video title, the system comprising memory coupled to at least one processor, the at least one processor configured to:

identify a video title available for presentation;

identify a portion of audio data, of the video title, representing dialogue spoken by an actor of the video title;

identify the actor who spoke the dialogue;

identify a first utterance of the dialogue to be replaced in the video title;

select, based on a replaceable amount of the portion of the audio data, a second utterance of a different lexical meaning than the first utterance to replace the first utterance in the portion of the audio data;

generate, based on a voice profile of the actor, first speech signals representing the actor uttering the second utterance;

remove second speech signals representing the actor uttering the first utterance from the dialogue;

add the first speech signals into the dialogue using at least a portion of the replaceable amount; and generate a modified version of the video title comprising the dialogue into which the speech signals were added.

17. The system of claim 16, wherein the first utterance represents an item, and wherein the second utterance represents a brand associated with the item.

18. The system of claim 16, wherein the at least one processor is further configured to:

divide the portion of the audio data into a first portion representing the dialogue and a second portion representing background noise during the dialogue; and combine the speech signals with the background noise, wherein the modified version of the video title further comprises the background noise combined with the dialogue into which the first speech signals were added.

19. The system of claim 16, wherein the at least one processor is further configured to:

divide the video title into the portion of the audio data and video data during the dialogue, wherein the modified version of the video title further comprises the video data combined with the dialogue into which the first speech signals were added.

20. The system of claim 19, wherein the at least one processor is further configured to:

detect a face of the actor, in the video data, speaking the dialogue; and synchronize visemes of the face of the actor with the first speech signals using phonemes of the second utterance.

* * * * *